(12) United States Patent
Kojo et al.

(10) Patent No.: US 11,520,340 B2
(45) Date of Patent: Dec. 6, 2022

(54) TRAFFIC LANE INFORMATION MANAGEMENT METHOD, RUNNING CONTROL METHOD, AND TRAFFIC LANE INFORMATION MANAGEMENT DEVICE

(71) Applicant: Nissan Motor Co., Ltd., Yokohama (JP)

(72) Inventors: Naoki Kojo, Kanagawa (JP);
Motonobu Aoki, Kanagawa (JP);
Takura Yanagi, Kanagawa (JP);
Hiroyuki Takano, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 228 days.

(21) Appl. No.: 16/637,111

(22) PCT Filed: Aug. 10, 2017

(86) PCT No.: PCT/JP2017/029196
§ 371 (c)(1),
(2) Date: Feb. 6, 2020

(87) PCT Pub. No.: WO2019/030916
PCT Pub. Date: Feb. 14, 2019

(65) Prior Publication Data
US 2020/0249682 A1    Aug. 6, 2020

(51) Int. Cl.
*G05D 1/02* (2020.01)
*B60W 30/09* (2012.01)
(Continued)

(52) U.S. Cl.
CPC .......... *G05D 1/0214* (2013.01); *B60W 30/09* (2013.01); *B60W 40/04* (2013.01);
(Continued)

(58) Field of Classification Search
CPC ... B60W 30/09; B60W 40/04; G01C 21/3407; G01C 21/3658; G01C 21/26;
(Continued)

(56) References Cited

U.S. PATENT DOCUMENTS

| 8,526,444 B2 * | 9/2013 | Jerbi | H04L 12/189 |
| | | | 709/239 |
| 9,557,736 B1 * | 1/2017 | Silver | G06K 9/00812 |

(Continued)

FOREIGN PATENT DOCUMENTS

| CN | 104851311 A | 8/2015 |
| JP | 2004-178194 A | 6/2004 |

(Continued)

*Primary Examiner* — Fadey S. Jabr
*Assistant Examiner* — Mohamed Abdo Algehaim
(74) *Attorney, Agent, or Firm* — Young Basile Hanlon & MacFarlane, P.C.

(57) ABSTRACT

A lane information management method for managing lane information using a processor is provided. This method includes acquiring road map information and information on a travel history that is represented by a travel trajectory on a road map, determining, using a plurality of the travel histories, whether or not a lane connected to an intersection is in a multiple lane form in which two or more lines of vehicles are formed on a single lane, and managing the lane information, including a result of determination of the multiple lane form in the lane information.

14 Claims, 8 Drawing Sheets

(51) Int. Cl.
  *B60W 40/04* (2006.01)
  *G01C 21/34* (2006.01)
  *G01C 21/36* (2006.01)
  *G08G 1/16* (2006.01)
  *G08G 1/00* (2006.01)

(52) U.S. Cl.
  CPC ..... *G01C 21/3407* (2013.01); *G01C 21/3658* (2013.01); *G08G 1/166* (2013.01); *G08G 1/20* (2013.01); *G05D 2201/0213* (2013.01)

(58) Field of Classification Search
  CPC ...... G01C 21/00; G01C 21/34; G05D 1/0214; G05D 2201/0213; G05D 1/0212; G06K 9/00805; G06K 9/00785; G06T 1/00; G06T 11/60; G08G 1/166; G08G 1/20; G08G 1/00; G08G 1/163; G06V 20/54; G06V 20/58; B62D 15/025
  USPC .......................................................... 701/26
  See application file for complete search history.

(56) References Cited

U.S. PATENT DOCUMENTS

| | | | | |
|---|---|---|---|---|
| 10,509,409 | B2* | 12/2019 | Bhatia | G05D 1/0231 |
| 11,009,875 | B2* | 5/2021 | Charrow | B62D 15/025 |
| 11,034,364 | B1* | 6/2021 | Narang | G01C 21/3407 |
| 2007/0159354 | A1* | 7/2007 | Rosenberg | G08G 1/0965 |
| | | | | 340/902 |
| 2009/0012709 | A1 | 1/2009 | Miyazaki | |
| 2009/0171523 | A1* | 7/2009 | Luo | B60W 10/02 |
| | | | | 701/22 |
| 2010/0060480 | A1* | 3/2010 | Bai | H04W 40/02 |
| | | | | 340/901 |
| 2010/0254294 | A1* | 10/2010 | Jerbi | H04L 12/189 |
| | | | | 370/312 |
| 2011/0170744 | A1* | 7/2011 | Malinovskiy | G06V 20/52 |
| | | | | 382/103 |
| 2012/0134532 | A1* | 5/2012 | Nl | G06K 9/00785 |
| | | | | 382/103 |
| 2012/0203417 | A1* | 8/2012 | Matsui | B60W 20/40 |
| | | | | 701/22 |
| 2013/0103304 | A1* | 4/2013 | Nishibashi | G01C 21/34 |
| | | | | 701/410 |
| 2013/0226402 | A1* | 8/2013 | Tsuruta | G08G 1/166 |
| | | | | 701/36 |
| 2013/0289824 | A1* | 10/2013 | Mudalige | G08G 1/167 |
| | | | | 701/1 |
| 2014/0278052 | A1* | 9/2014 | Slavin | G08G 1/0129 |
| | | | | 701/400 |
| 2014/0372022 | A1* | 12/2014 | Witmer | G06F 16/29 |
| | | | | 701/423 |
| 2015/0142303 | A1 | 5/2015 | Nishibashi et al. | |
| 2015/0154861 | A1* | 6/2015 | Hillenbrand | B60W 30/16 |
| | | | | 701/2 |
| 2016/0098496 | A1* | 4/2016 | Joshi | G01C 21/3867 |
| | | | | 703/1 |
| 2016/0178390 | A1 | 6/2016 | Nishibashi et al. | |
| 2017/0053533 | A1* | 2/2017 | Kuroda | G08G 1/167 |
| 2017/0205235 | A1 | 7/2017 | Vladimerou | |
| 2017/0227637 | A1* | 8/2017 | Hada | G01S 17/931 |
| 2017/0270785 | A1* | 9/2017 | Umehara | G08G 1/08 |
| 2017/0274898 | A1* | 9/2017 | Nakamura | B60W 30/18163 |
| 2018/0158325 | A1* | 6/2018 | Bernhardt | G01C 21/30 |
| 2018/0259957 | A1* | 9/2018 | Charrow | G08G 1/166 |
| 2018/0314264 | A1* | 11/2018 | Bhatia | G05D 1/0231 |
| 2019/0025837 | A1* | 1/2019 | Conor | G05D 1/0214 |
| 2019/0113916 | A1* | 4/2019 | Guo | B62D 15/025 |
| 2019/0139329 | A1* | 5/2019 | Uchida | G08G 1/161 |
| 2020/0010118 | A1* | 1/2020 | Fukaya | B62D 15/029 |

FOREIGN PATENT DOCUMENTS

| | | |
|---|---|---|
| JP | 2006-1/1/53 A | 7/2006 |
| JP | 2009-014574 A | 1/2009 |
| JP | 2013-173383 A | 9/2013 |
| JP | 2016-075905 A | 5/2016 |
| JP | 2017-027175 A | 2/2017 |
| WO | 2012/011156 A1 | 1/2012 |

* cited by examiner

TRAFFIC LANE INFORMATION MANAGEMENT METHOD, RUNNING CONTROL METHOD, AND TRAFFIC LANE INFORMATION MANAGEMENT DEVICE

TECHNICAL FIELD

The present invention relates to a lane information management method, a travel control method, and a lane information management device.

BACKGROUND

A method of modeling an intersection structure has heretofore been known (JP2016-75905A). This method includes compiling a set of potential links between lane node locations and assessing, for each link, a probability that the link is a valid link to be used for a model intersection.

SUMMARY

Unfortunately, the above prior art has a problem in that it cannot respond to a lane in which two or more lines of vehicles are formed on a single lane, and lane information cannot be appropriately managed.

A problem to be solved by the present invention is to provide a method and a device with which lane information can be appropriately managed.

The present invention solves the above problem through determining, using a plurality of the travel histories, whether or not two or more vehicles in a lane connected to an intersection form different lines in a lateral direction of the vehicles on a single lane and managing lane information, including a result of determination of the multiple lane form in the lane information.

According to the present invention, an effect can be obtained that the lane information can be appropriately managed.

DETAILED DESCRIPTION

Hereinafter, one or more embodiments of the present invention will be described with reference to the drawings.

First Embodiment

One or more embodiments of the present invention will be described below with reference to the drawings. The embodiments will be described by exemplifying a case in which the lane information management device according to the present invention is applied to an information management system having a vehicle and a server.

Figure 1:
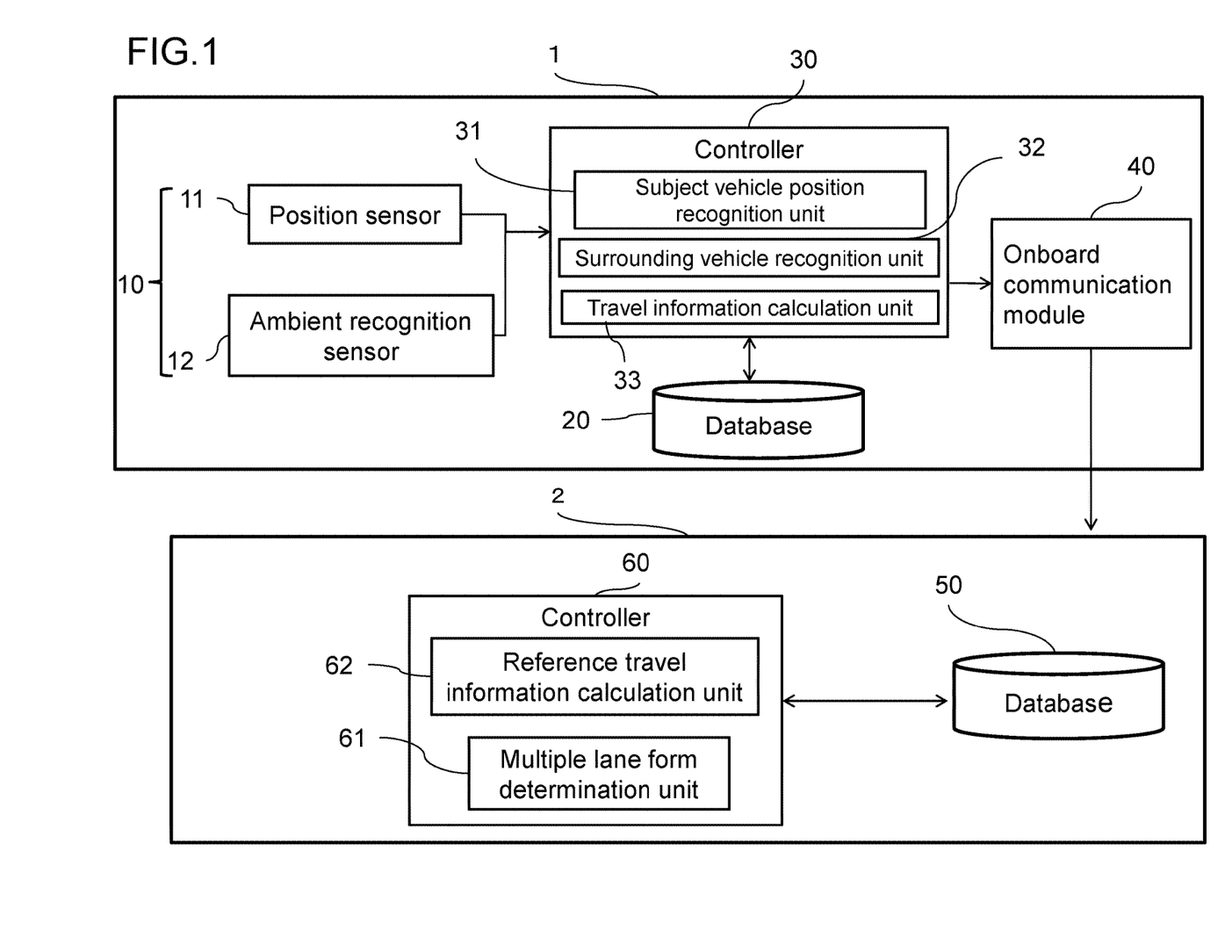
FIG. 1 is a block diagram of an information management system according to one or more embodiments of the present invention.

FIG. 1 is a diagram illustrating the block configuration of an information management system 1. The vehicle information management system according to one or more embodiments of the present invention includes a vehicle 1 and a server 2. The vehicle 1 includes a set of sensors 10, a database 20, a controller 30, and an onboard communication module 40.

The set of sensors 10 includes, for example, a position sensor 11 and an ambient recognition sensor 12. The set of sensors detects the position of a subject vehicle, the traveling state of the subject vehicle, and the situation around the subject vehicle. The position sensor 11 and the ambient recognition sensor 12 are merely an example of the set of sensors, and other sensors may also be used, provided that they can detect the positional information of the vehicle and the presence or absence of a surrounding vehicle.

The position sensor 11 is a sensor that detects the current position of the subject vehicle and this sensor is adapted, for example, to the Global Positioning System (GPS)/Inertial Navigation System (INS). The GPS is a system that measures the position of the subject vehicle using information transmitted from satellites. The INS uses a gyro sensor or an acceleration sensor to measure a relative position from the initial state (initial position) of the vehicle. The GPS/INS device is a device that measures the current position of the vehicle with a high degree of accuracy by complementing the absolute positional information measured by the GPS with the relative positional information obtained by the INS. In one or more embodiments of the present invention, it is assumed that, in addition to a determination of a multiple lane form in which two or more lines of vehicles are formed on a single lane (i.e., a determination of a state of multiple lines), path information of a lane in the multiple lane form is used for autonomous (automated) driving control, as will be described later. To this end, the position detection accuracy of the position sensor 11 is preferably a relatively high accuracy of about several tens of centimeters.

The position sensor 11 may be an omnidirectional ranging sensor as another configuration. When an omnidirectional ranging sensor is used as the position sensor 11, the vehicle position may be calculated, for example, by map matching. Additionally or alternatively, a camera may be used as the position sensor, and the vehicle position may be calculated using an image captured by the camera. In the following description, an example in which a GPS/INS device is used as the position sensor 11 will be described.

The ambient recognition sensor 12 includes, for example, laser scanners attached near the front bumper and rear bumper of the vehicle, and the laser scanners detect the position and type of an object located ahead of the vehicle and the position and type of an object located behind the vehicle. The type of an object indicates whether or not the object is a vehicle. The ambient recognition sensor 12 may include other sensors than the laser scanners, provided that they can detect the position and type of an object around the vehicle.

The database 20 is a device that stores at least road map information. The database 20 is a device that can be accessed by the controller 30, and allows the information to be rewritten or processed in an appropriate manner. The road information includes accurate positional information of road boundaries and stop lines of each lane and is high-definition map information suitable for the autonomous driving. A unique ID is given to each lane represented by the road map information. When the lane information is added or updated, the ID can be used to specify the lane.

The road map information recorded in the database 20 may be simple map information such as a navigation map, but in order to make use of the map information in the autonomous driving, it is preferred to use a highly accurate map. In the following description, it is assumed that the map information recorded in the database 20 is a highly accurate map.

The controller 30 is a processor having a function of managing the vehicle information and the road map information, which are necessary in the process executed in the server 2 for a determination of the multiple lane form. The controller 30 includes a read only memory (ROM) that stores a program for executing the information management process, a central processing unit (CPU) that executes the program stored in the ROM thereby to serve as a part of the lane information management device, and a random access memory (RAM) that serves as an accessible storage device. The controller 30 is composed of hardware such as ASIC or FPGA and has a subject vehicle position recognition unit 31, a surrounding vehicle recognition unit 32, and a travel information calculation unit 33 as functional blocks for managing information. Details of these functional blocks will be described later. The controller 30 acquires detection values from the set of sensors 10, accesses the database 20 to calculate the travel information of the vehicle, and outputs the calculation result to the onboard communication module 40.

The onboard communication module 40 is a module for transmitting the travel information retained in the vehicle to the server 2 which exists at a remote location. The onboard communication module 40 includes an onboard device having a 4G LTE mobile communication function, for example, and is connected to the controller 30 via a CAN. The onboard communication module 40 transmits the signals received from the controller 30 to the server 2 via a mobile communication line as needed. The onboard communication module 40 may be an onboard device having a Wi-Fi communication function and may store the information transmitted from the controller 30 in a HDD during the travel of the vehicle and transmit the information stored in the HDD to the server 2 at the timing when the Wi-Fi connection is established.

The configuration of the server 2 will then be described. The server 2 includes a database 50 and a controller 60. The server 2, which is composed of one or more computers, receives signals transmitted from a plurality of vehicles and performs information processing. Description of the specific structure of the server will be omitted, but a commonly used server system may be used as the server 2.

The travel information database 50 is a database that retains the travel information sent from the onboard communication module 40. In one or more embodiments of the present invention, there is a plurality of vehicles that can collect data, and all the information from the plurality of vehicles is collected in the database 50. The controller 60 is a processor having a multiple lane form determination function of determining whether or not a lane connected to an intersection is in the state of multiple lines and a calculation function of calculating reference travel information. The controller 60 includes a ROM that stores programs for executing various functions, a CPU, a RAM, and other necessary components. The controller 60, which is hardware for executing the programs, includes a multiple lane form determination unit 61 and a reference travel information calculation unit 62 as functional blocks. Details of these functional blocks will be described later. The database 50 stores the lane information and the travel information. The lane information and the travel information are associated with each other by the lane ID. The controller 60 can specify a lane to be determined for the multiple lane form using the lane ID and extract information to which the lane ID is given. The controller 60 determines whether or not the lane is in the multiple lane form, on the basis of a plurality of extracted travel information pieces. A method of determining the multiple lane form will be described later. When recording the result of determination of the multiple lane form in the database 50, the controller 60 uses the vehicle ID to specify the information to be recorded or rewritten.

Figure 2:
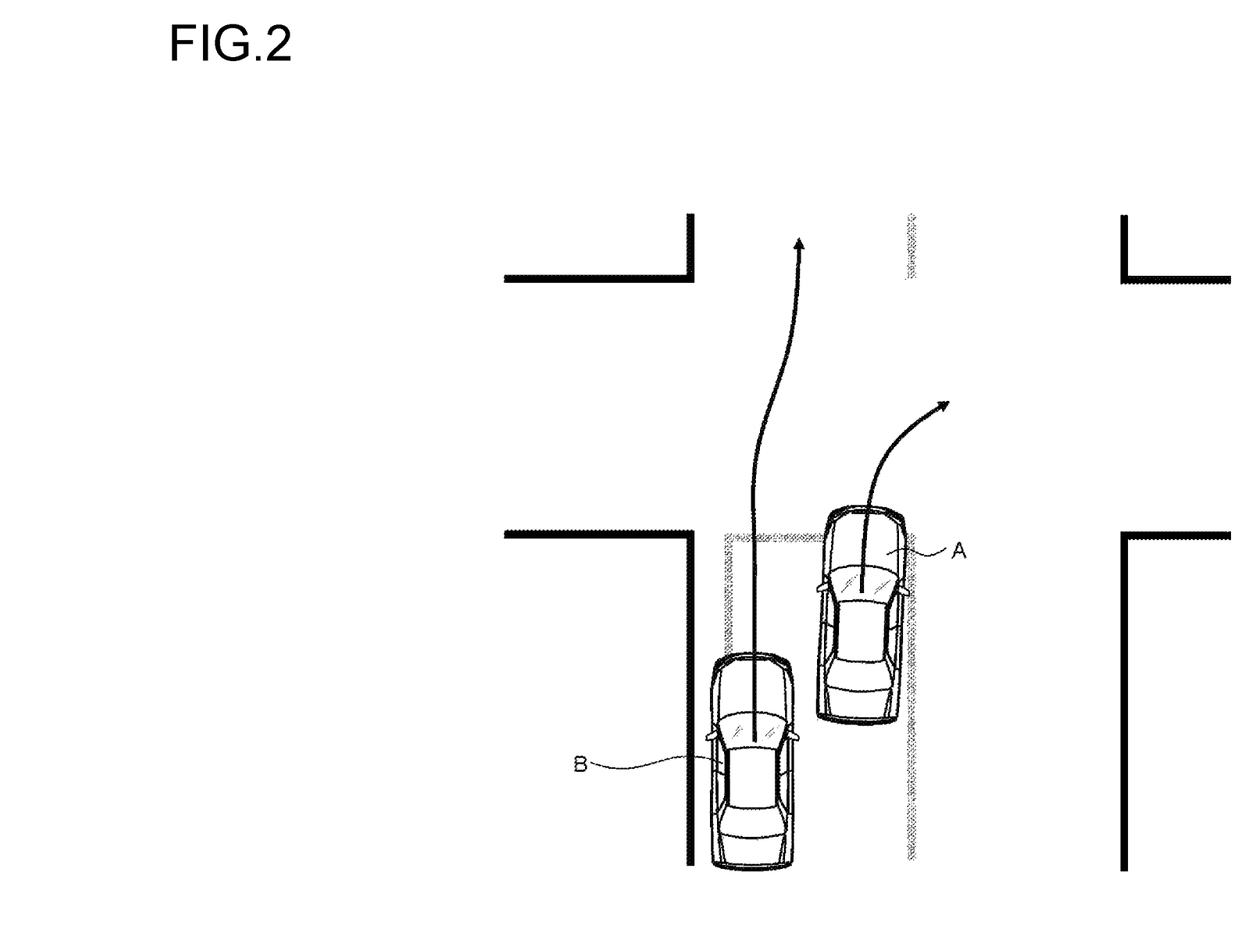
FIG. 2 is a conceptual diagram for describing a road situation in which a lane is in the multiple lane form.

Here, the multiple lane form will be described with reference to FIG. 2. FIG. 2 is a conceptual diagram for describing a road situation in which a lane is in the multiple lane form. Usually, the map data recorded in a navigation device and the map data used for autonomous driving are created on the assumption that vehicles travel in accordance with traffic rules that are preliminarily provided. In this regard, on a single-lane road, for example, it is not assumed that vehicles travel while forming multiple lines, and in autonomous driving, vehicles travel in accordance with rules (information) that are provided on the map data. In an actual traffic situation, however, even when a lane connected to an intersection is physically a single lane, if the lane width of the single lane is wide, then, depending on whether a vehicle turns right or travels straight ahead, a specific state occurs in which two or more vehicles travel while forming two lines, that is, a state in which the single lane is virtually in a two-lane form. Such a phenomenon occurs before an intersection. As illustrated in FIG. 2, on a Japanese road with one lane on one side, for example, when the lane width (road width) is wide, a right-turning vehicle A makes a stop with a space on the left side for a following vehicle, and a straight-traveling vehicle B or a left-turning vehicle passes through the left side of the right-turning vehicle A. Such a traveling scene often occurs in daily life and represents a so-called local rule. If the autonomous driving is assumed in a state in which the map data does not include information on the multiple lane form, it is difficult for the autonomous driving control device to perceive the road situation from the detection result of a sensor near an intersection. The lane information management device according to one or more embodiments of the present invention determines whether or not a lane connected to an intersection is in the state of multiple lines in which two or more lines of vehicles are formed on a single lane (i.e., whether or not the single lane is virtually in the multiple lane form), and manages the lane information, including a result of determination of the state of multiple lines in the lane information.

Functions of the controller 30 will be described below.

The subject vehicle position recognition unit 31 recognizes the subject vehicle position on the basis of the information detected by the position sensor 11. When the position sensor 11 is a GPS/INS device, the positional information which is input from the position sensor 11 may be employed as the current position of the subject vehicle. When the position sensor 11 is an omnidirectional ranging sensor, the subject vehicle position recognition unit 31 acquires the map information from the database 20 and calculates the relative position of the vehicle on the map (map matching). Methods for the map matching are not particularly limited, and a widely known general scheme may be used. The vehicle position suitable for determination of the multiple lane form is a relative position on the map, and the map matching is thus preferred in that the position of the vehicle on the map can be directly calculated. However, if, even with the use of a GPS/INS device as the position sensor 11, the accuracy of the map information is high and an error relative to the absolute position is sufficiently small, the GPS/INS device may be used.

The surrounding vehicle recognition unit 32 recognizes each of a preceding vehicle and a following vehicle on the basis of the detection information detected by the ambient recognition sensor 12 and the map information recorded in the database 20. The detection information from the ambient recognition sensor 12 includes object information of an object located ahead of the vehicle and object information of an object located behind the vehicle. The object information includes positional information of objects, type information for distinguishing vehicles, pedestrians, bicycles, and unrecognizable objects, and other similar information. The position of an object detected by the ambient recognition sensor 12 is represented by a relative position from the subject vehicle. The surrounding vehicle recognition unit 32 converts the position coordinates of an object into a map coordinate system using the positional information of the subject vehicle recognized by the subject vehicle position recognition unit 31. The coordinate conversion may be carried out by a commonly used scheme on the assumption of a plane. The ambient recognition sensor 12 cross-checks the position of an object with the map information stored in the database 20 and thereby calculates which lane the object is in or whether the object is located outside the travel lane of the subject vehicle. In addition, the ambient recognition sensor 12 recognizes, from the type information included in the detection information from the ambient recognition sensor 12, whether or not the object located around the subject vehicle is a vehicle.

Provided that the recognized object is a vehicle (another vehicle), when the other vehicle is located ahead of the subject vehicle on the same lane as that for the subject vehicle and the distance between the subject vehicle and the other vehicle is not more than a certain distance, the surrounding vehicle recognition unit 32 determines that there is a preceding vehicle. The surrounding vehicle recognition unit 32 sets the certain distance in accordance with the vehicle speed as in a commonly used preceding vehicle recognition scheme in the preceding vehicle following travel. For example, when the vehicle speed of the subject vehicle is 100 km/h, the surrounding vehicle recognition unit 32 sets the certain distance to 100 m. Additionally or alternatively, when the vehicle speed of the subject vehicle is 20 km/h, the surrounding vehicle recognition part 32 sets the certain distance to 20 m. Also for another vehicle traveling behind the subject vehicle, when the other vehicle is located behind the subject vehicle on the same lane as that for the subject vehicle and the distance between the subject vehicle and the other vehicle is not more than a certain distance, the surrounding vehicle recognition unit 32 determines that there is a following vehicle.

When a determination is made that there is a preceding vehicle, the surrounding vehicle recognition unit 32 performs tracking to calculate a travel trajectory. The tracking may be performed by a commonly known scheme, and the position of another vehicle (relative position with respect to the subject vehicle) may be calculated periodically. The surrounding vehicle recognition unit 32 transmits information on the presence or absence of a preceding vehicle, information on the presence or absence of a following vehicle, and information on the travel trajectory of the preceding vehicle to the travel information calculation unit 33.

The travel information calculation unit 33 calculates the travel information as information necessary in the server 2 for a determination of the multiple lane form. The travel information calculation unit 33 transmits the calculated travel information to the onboard communication module 40. The onboard communication module 40 transmits the travel information to the server 2. The travel information includes information on the travel path of a lane in the lane connected to an intersection. The travel information includes the following information items in addition to the information on the travel path. Note that not all of the information items exemplified below are necessary.

Information on the Lateral Direction of a Vehicle

The travel information calculation unit 33 calculates the lateral position of another vehicle when the other vehicle enters an intersection, on the basis of the travel trajectory of the preceding vehicle. Additionally or alternatively, the travel information calculation unit 33 calculates the lateral position of the subject vehicle when the subject vehicle enters the intersection, on the basis of the travel trajectory of the subject vehicle. The lateral direction of a vehicle refers to a direction perpendicular to the traveling direction of the vehicle. The travel information calculation unit 33 includes the calculated lateral positional information of the subject vehicle and the calculated lateral positional information of the other vehicle in the travel information and transmits the travel information to the onboard communication module 40.

Traveling Direction Information

The travel information calculation unit 33 calculates traveling direction information that represents whether a preceding vehicle travels straight ahead, turns right, or turns left after entering an intersection, on the basis of the travel trajectory of the preceding vehicle. The travel information calculation unit 33 also calculates the traveling direction information of the subject vehicle on the basis of the travel trajectory of the subject vehicle. The traveling direction information is represented by the lane ID after a vehicle has traveled through the intersection. The server 2 can specify the traveling direction of a vehicle from the relationship between the lane ID when the vehicle enters the intersection and the lane ID of a lane in which the vehicle travels after entering the intersection. The travel information calculation unit 33 includes the traveling direction information of the subject vehicle and another vehicle in the travel information and transmits the travel information to the onboard communication module 40.

Vehicle Information

The travel information calculation unit 33 calculates vehicle information regarding the behavior of a vehicle, such as the vehicle speed, accelerator operation, brake operation, and blinker operation of another vehicle or of the subject vehicle. The travel information calculation unit 33 includes the calculated vehicle information in the travel information and transmits the travel information to the onboard communication module 40.

Determination Result Information of the Traveling Direction

The travel information calculation unit 33 compares the travel trajectory of the subject vehicle with the travel trajectory of another vehicle before and after entering an intersection and thereby determines whether or not there is a preceding vehicle that has advanced in a different traveling direction than that of the subject vehicle. The travel information calculation unit 33 includes the determination result in the travel information and transmits the travel information to the onboard communication module 40. The travel information may include, in addition to the determination result, information on the lane ID of a lane in which the preceding vehicle to be determined has traveled after exiting the intersection.

Following Vehicle Information

Acquiring information that represents the recognition result of a following vehicle from the surrounding vehicle recognition unit 32, the travel information calculation unit 33 includes information on whether there is a following vehicle behind the subject vehicle in the travel information and transmits the travel information to the onboard communication module 40.

Figure 3:
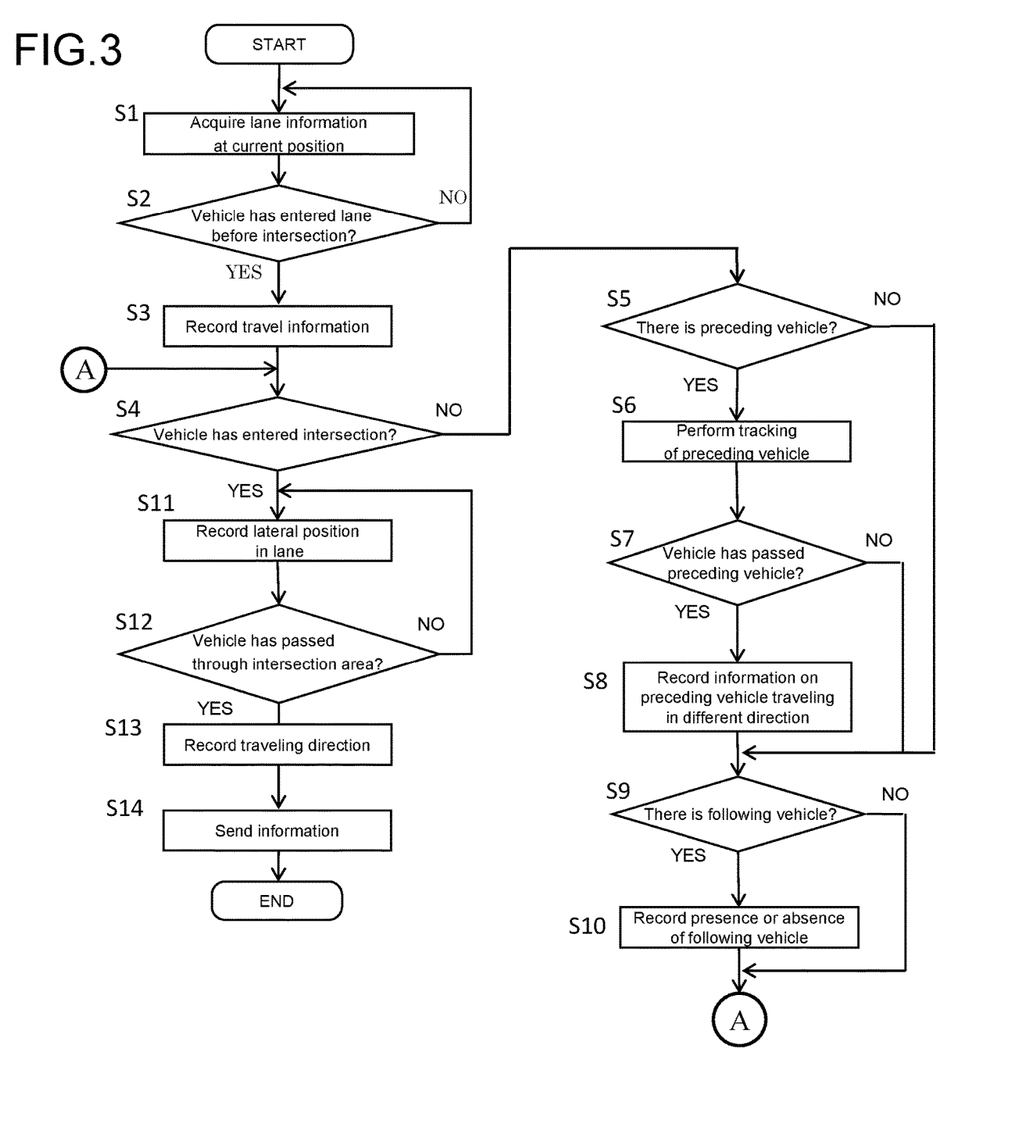
FIG. 3 is a flowchart illustrating a control flow in a travel information calculation unit of FIG. 1.

The control flow in the travel information calculation unit 33 will then be described with reference to FIG. 3.

In step S1, the travel information calculation unit 33 acquires the positional information of the subject vehicle from the subject vehicle position recognition unit 31 and cross-checks the positional information of the subject vehicle with the map database to calculate the position in a lane while specifying the lane ID as the lane information of the subject vehicle.

[In step S2, the travel information calculation unit 33 determines whether or not the subject vehicle has entered a lane before an intersection, from the lane information and the subject vehicle positional information. The travel information calculation unit 33 performs the determination of entrance into the intersection area using the vehicle ID recorded for each lane in the map database 20. Another scheme may include preliminarily recording the center position of the intersection in the map database 20, and when the distance between the center position and the subject vehicle position is not more than a certain value, determining that the subject vehicle has entered a lane before the intersection.

When a determination is made that the subject vehicle has entered a lane before the intersection, the travel information calculation unit 33 executes the control flow of step S3. When a determination is made that the vehicle has not entered a lane before the intersection, the travel information calculation unit 33 executes the control flow of step S1.

In step S3, the travel information calculation unit 33 records the information on the lane before the intersection in the database 20 as the travel information. The travel information recorded in step S3 is not limited to the positional information in a lane and may include various vehicle information items, such as a vehicle speed, an accelerator/brake operation, and a blinker operation.

In step S4, the travel information calculation unit 33 determines whether or not the subject vehicle has entered the intersection area through the lane before the intersection. When the subject vehicle has entered the intersection, the travel information calculation unit 33 executes the control flow of step S11. When the subject vehicle has not entered the intersection, the travel information calculation unit 33 executes the control flow of step S5. The same method in the determination process of step S2 may be used as the determination process in the control flow of step S4.

In step S6, using the preceding vehicle tracking function of the surrounding vehicle recognition unit 32, the travel information calculation unit 33 performs tracking of a preceding vehicle while the subject vehicle is traveling in the lane before the intersection. In step S7, on the basis of the tracking result, the travel information calculation unit 33 determines whether or not the subject vehicle has passed the preceding vehicle while the subject vehicle is traveling in the lane before the intersection. When the subject vehicle has passed the preceding vehicle, the control flow of step S8 is executed. When the subject vehicle has not passed the preceding vehicle, the control flow of step S9 is executed. The fact that the subject vehicle has passed the preceding vehicle means that the lane in which the subject vehicle is traveling is in the multiple lane form, so the determination result of step S7 can be used as a criterion for determining that the lane is in the multiple lane form.

In step S8, the travel information calculation unit 33 records in the database 20 the travel information that there is a preceding vehicle traveling in a different direction. The travel information of the preceding vehicle includes information on determination results of the travel trajectory and traveling direction of the preceding vehicle or the vehicle information of the preceding vehicle and other similar information.

In step S9, the travel information calculation unit 33 acquires a following vehicle recognition result from the surrounding vehicle recognition unit 32 and determines whether or not there is a following vehicle on the basis of the following vehicle recognition result. When there is a following vehicle, the control of step S10 is executed. When there is no following vehicle, the process returns to step S4.

In step S10, the travel information calculation unit 33 records in the database 20 the travel information which represents the presence of the following vehicle.

In step S11, the travel information calculation unit 33 records in the database 20 the lateral position of the subject vehicle in the lane when entering the intersection area (i.e., when exiting the lane before the intersection).

In step S12, the travel information calculation unit 33 determines whether or not the subject vehicle has passed through the intersection area. When the subject vehicle has passed through the intersection area, the travel information calculation unit 33 executes the control process of step S13. When the subject vehicle has not passed through the intersection area, the travel information calculation unit 33 executes the control process of step S11. The same method in the determination process of step S2 may be used as the determination process in the control flow of step S12.

In step S13, the travel information calculation unit 33 cross-checks the subject vehicle positional information after the subject vehicle exits the intersection area with the map information to specify the lane ID of a lane in which the subject vehicle travels after exiting the intersection area, and records the lane ID in the database 20. The lane ID is used to record the traveling direction, but the intersection may be not only a T-shaped intersection or a crossroad but also complicated, such as in a five-road intersection. It is possible to respond to an intersection in any shape by using the lane ID of a lane in which the vehicle travels after passing through the intersection, rather than by using abstract information, such as traveling straight ahead, turning right, or turning left.

In step S14, the travel information calculation unit 33 collects the various travel information pieces calculated in the above control process, associates them with the lane ID of the lane before the intersection, and then transmits them to the onboard communication module 40, thus concluding the control process.

Functions of the controller 60 will be described below.

The multiple lane form determination unit 61 extracts relevant travel information on the basis of the lane ID of a lane to be determined and determines the multiple lane form on the basis of the extracted travel information. Determination of the multiple lane form is performed by the method described below. Any one of the following determination methods may be used, or the determination results may be combined.

Clustering of Travel Trajectories

The travel trajectory of a vehicle is expressed by a set of vehicle positions (x, y). First, the multiple lane form determination unit 61 extracts the travel information of a lane to be determined for the multiple lane form from the database 50 on the basis of the lane ID of the lane and cuts out, from the travel trajectory, a partial trajectory from when entering the lane to when exiting the lane. Then, the multiple lane form determination unit 61 equalizes the number of points on the trajectory with the number of points on another trajectory so that the trajectories of vehicles can be easily compared with each other.

Figure 4:
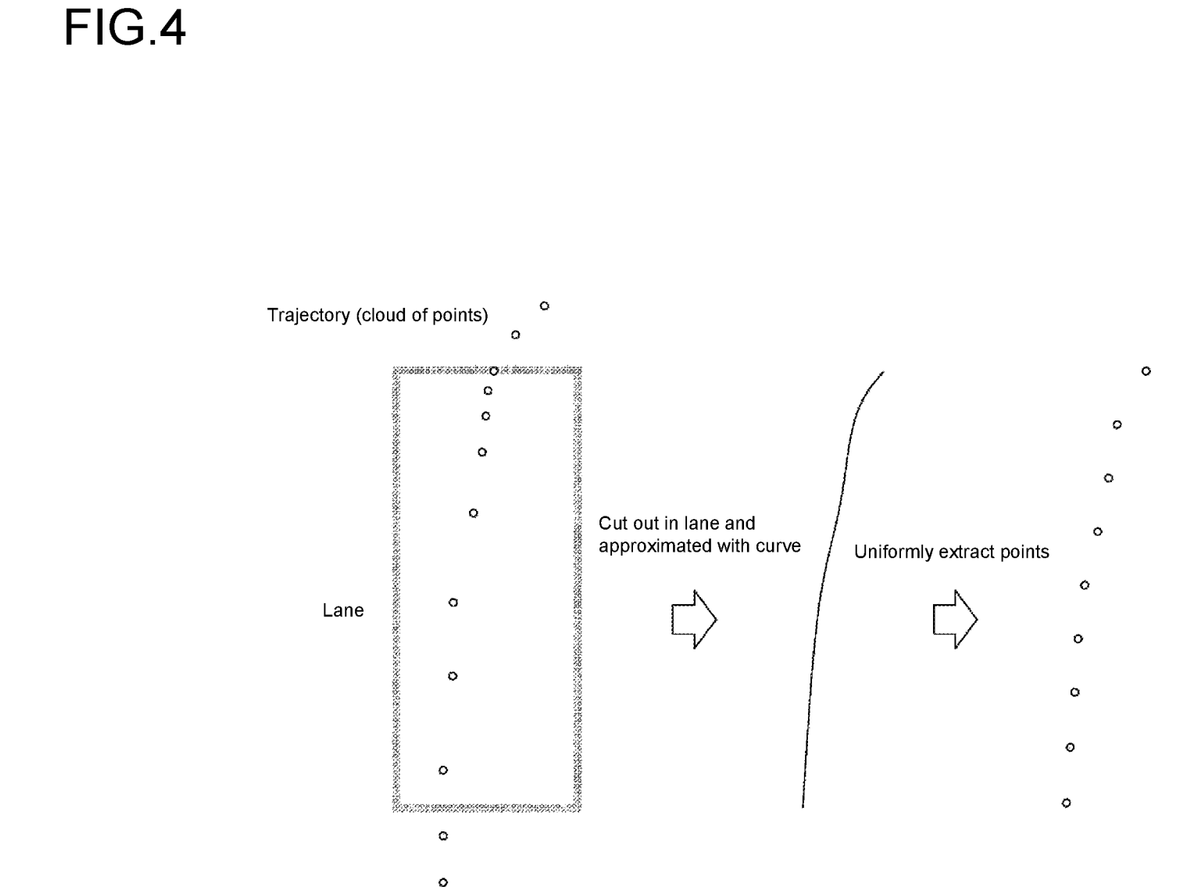
FIG. 4 is a diagram for describing a process executed in a multiple lane form determination unit of FIG. 1, that is, a conceptual diagram of a process of equalizing the number of points on a trajectory.

FIG. 4 is a conceptual diagram of a process of equalizing the number of points on a trajectory. As illustrated in FIG. 4, the travel trajectory of a vehicle is represented by a cloud of points on a lane. After the cloud of points is approximated with a spline curve, for example, a line segment may be divided into an arbitrary number of segments to extract the points. After equalizing the number of points, the multiple lane form determination unit 61 performs clustering by a commonly known scheme such as k-means clustering and determines whether or not points are divided into a plurality of clusters, using an arbitrary threshold. When the points are divided into a plurality of clusters, the multiple lane form determination unit 61 determines that the lane is in the multiple lane form.

Clustering With Lateral Positions When Entering an Intersection

Figure 5:
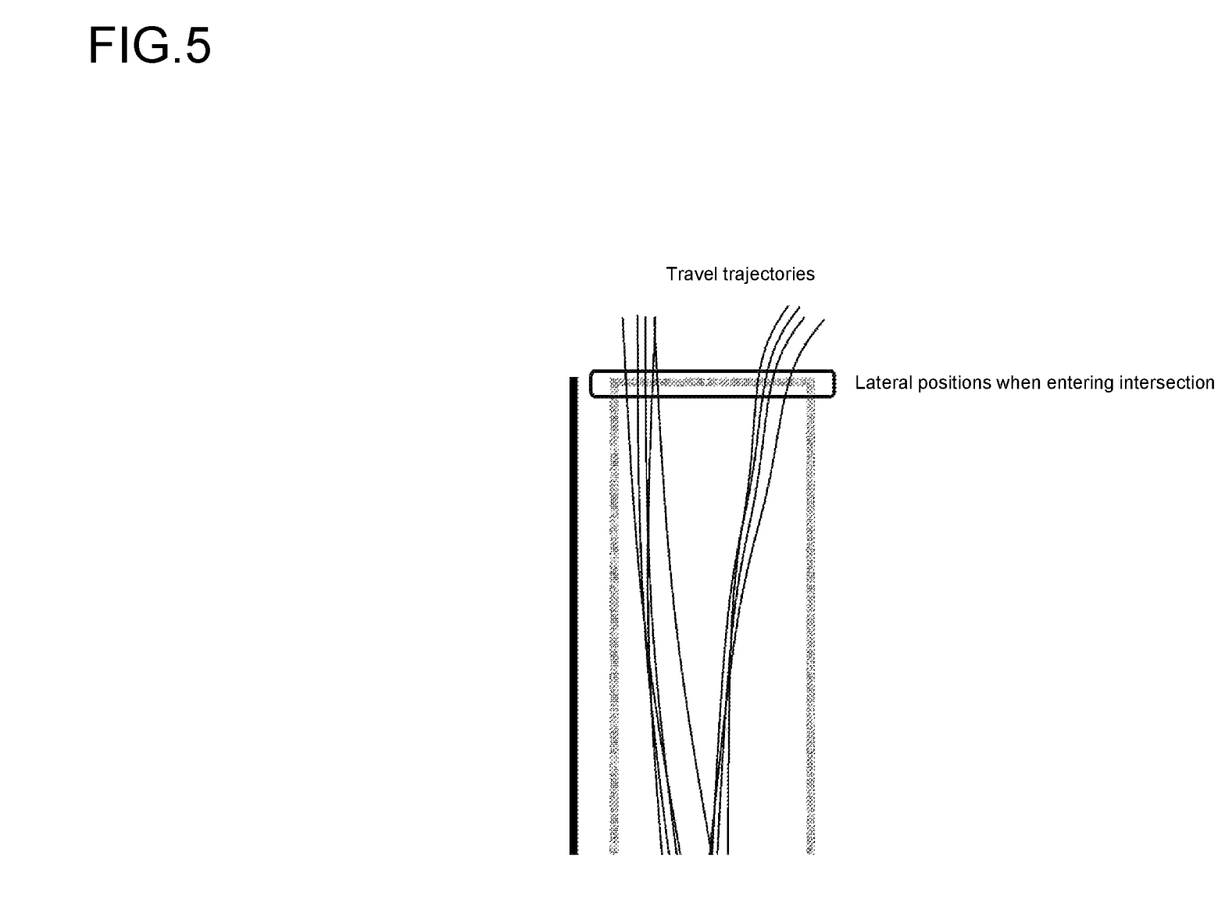
FIG. 5 is a conceptual diagram illustrating an example of the distribution of lateral positions of vehicles in a lane in the multiple lane form.

The multiple lane form determination unit 61 may use another scheme of determining the multiple lane form using lateral positions when exiting a lane. FIG. 5 is a conceptual diagram illustrating an example of the distribution of lateral positions of vehicles in a lane in the multiple lane form. The multiple lane form determination unit 61 extracts a terminated line of the lane to be determined from the database 50. The terminated line is extracted in an area when the vehicles enter an intersection. The multiple lane form determination unit 61 calculates points at which the terminated line intersects with respective travel trajectories. The multiple lane form determination unit 61 performs clustering on the calculated points of intersection by k-means clustering or other similar scheme. The multiple lane form determination unit 61 determines whether or not the points of intersection are divided into a plurality of clusters using an arbitrary threshold (e.g., whether or not the distance between clusters is 1 m or more). That is, the multiple lane form determination unit 61 specifies one or more sets of lateral positions of the vehicles within an area including the terminated line. Then, when two or more position sets can be specified in the area, the multiple lane form determination unit 61 determines whether or not a distance or distances between the two or more position sets are a predetermined length or more. Then, when the distance or distances between the two or more position sets are not less than the predetermined length, the multiple lane form determination unit 61 determines that the lane including the area is in a state of the multiple lane form. For example, in the example of FIG. 5, respective position sets are formed on the right side and left side in the area on a single lane (the area including the terminated line), and when the spacing between the position sets is not less than a length corresponding to the vehicle width, the multiple lane form determination unit 61 determines that the lane is in a state of the multiple lane form.

Classification in Accordance With the Traveling Direction

The multiple lane form determination unit 61 may use another scheme of classifying the travel trajectories in accordance with the traveling direction. The multiple lane form determination unit 61 determines whether or not the traveling direction is the same on the basis of the lane ID of a next lane which a vehicle enters after passing through an intersection. The multiple lane form determination unit 61 calculates an average lateral position when exiting the lane for the travel trajectories in the same traveling direction and determines whether or not there is a difference in the lateral position between the traveling directions. Specifically, for example, when the lateral positions when exiting the lane are separated from each other by a certain distance (e.g., 1 m) or more, a determination is made that the lane in that traveling direction is in the multiple lane form. That is, when the positional information representing the lateral direction of vehicles can be classified into a set that represents traveling straight ahead and a set that represents turning right or left in an area through which the vehicles enter the intersection, the multiple lane form determination unit 61 determines that the lane is in a state of the multiple lane form.

Classification in Accordance With the Presence or Absence of a Preceding Vehicle Traveling in a Different Direction The multiple lane form determination unit 61 may use another scheme of classifying the travel trajectories in accordance with the presence or absence of a preceding vehicle traveling in a different direction. As described above, the travel information calculation unit 33 determines whether or not there is a preceding vehicle that has advanced in a different traveling direction than that of the subject vehicle, and the travel information includes information on the determination result. The multiple lane form determination unit 61 therefore calculates an average lateral position when vehicles enter the intersection, and determines whether or there is a difference in the average lateral position. The determination method may be the same method as described above (classification in accordance with the traveling direction).

Classification in Accordance With the Presence or Absence of a Following Vehicle The multiple lane form determination unit 61 may use another scheme of performing classification in accordance with the presence or absence of a following vehicle. Then, the multiple lane form determination unit 61 determines whether or not the lane is in a state of the multiple lane form on the basis of the classification result. The specific scheme may be the same as that for a preceding vehicle.

When a determination is made that the lane is in a state of the multiple lane form, the multiple lane form determination unit 61 rewrites, on the database 50, the link information of the lane to be determined with information that represents the state of the multiple lane form, thereby updating the lane information. Specifically, when the lane is in the multiple lane form between traveling straight ahead and turning right, for example, the right turn lane is additionally recorded. When the information in the database 50 is updated, the server 2 may communicate with the vehicle 1 and also update the information in the database 20.

The reference travel information calculation unit 62 acquires the determination information as to whether or not the lane is in the multiple lane form from the multiple lane form determination unit 61, calculates reference travel information for each lane, and stores the reference travel information in the database 50 in association with the lane ID. The reference travel information is information used in the autonomous driving and is recorded for each separated lane of the same lane ID (referred herein to as an "additional lane" for convenience). Information included in the reference travel information may include a travel trajectory as well as a speed profile, an accelerator opening degree, a brake control amount, and blinker operation information. The travel trajectory for use may be an average trajectory (a point cloud of vehicle positions) that is extracted by the clustering executed by the multiple lane form determination unit 61. The speed profile, accelerator opening degree, brake control amount, and blinker operation information may be stored in association with each point on a travel trajectory. For example, when a travel trajectory is expressed by 20 points, the vehicle speed is recorded as 60 km/h at the first point, as 58 km/h at the second point, and so on. The reference travel information is very useful information in the autonomous driving and may therefore be retained also when a lane is not in the multiple lane form.

The server 2 may be provided with a database that stores multiple lane form information, in addition to the database 50. That database stores, as the multiple lane form information, information on whether or not a lane is in the multiple lane form and the reference travel information for each lane so that these information items are associated with the lane information included in the map information. Information recorded in the database is provided to the vehicle 1 by means of data distribution or the like and used for the purpose of driving assistance or the like.

As described above, one or more embodiments of the present invention include acquiring road map information and information on a travel history that is represented by a travel trajectory on a road map, determining, using a plurality of the travel histories, whether or not a lane connected to an intersection is in a multiple lane form in which two or more lines of vehicles are formed on a single lane, and managing lane information, including a result of determination of the multiple lane form in the lane information. This enables management of information on the multiple lane form in which the lane is physically a single lane but practically in a two-lane form (or three-lane form).

One or more embodiments of the present invention include calculating lateral positions of the vehicles in an approach area through which the vehicles enter the intersection, specifying a set of the lateral positions as a position set, and when two or more position sets including the position set are specified in the approach area and a distance or distances between the two or more position sets are not less than a predetermined value, determining that the lane including the approach area is in the multiple lane form. This allows the multiple lane form to be determined with a higher degree of accuracy than that in clustering the travel histories as a whole in the lane. The multiple lane form may occur suddenly before entering an intersection; therefore, if the travel paths are clustered over the whole area of a lane, it may not be able to make an accurate determination because paths before being in the multiple lane form are included, but in one or more embodiments of the present invention, the determination accuracy can be enhanced.

One or more embodiments of the present invention include specifying the position sets in association with traveling straight ahead after entering the intersection and turning right or left after entering the intersection, and when the position sets can be classified in the approach area into a set that represents the traveling straight ahead and a set that represents the turning right or left, determining that the lane including the approach area is in the multiple lane form. This allows the multiple lane form to be determined when the multiple lane form occurs in accordance with the traveling direction.

One or more embodiments of the present invention include specifying the lane determined to be in the multiple lane form among lanes represented by the road map information and rewriting link information of the specified lane with information representing the multiple lane form. This allows the information on the number of lanes to be rewritten with information adaptable to the actual traffic environment.

One or more embodiments of the present invention include calculating reference travel information including information on a travel path in the lane on the basis of the plurality of travel histories and calculating the reference travel information for each of two or more virtual lanes included in the lane determined to be in the multiple lane form. This makes it possible to manage detailed information at a level that can be used in the autonomous driving or the like.

Figure 6:
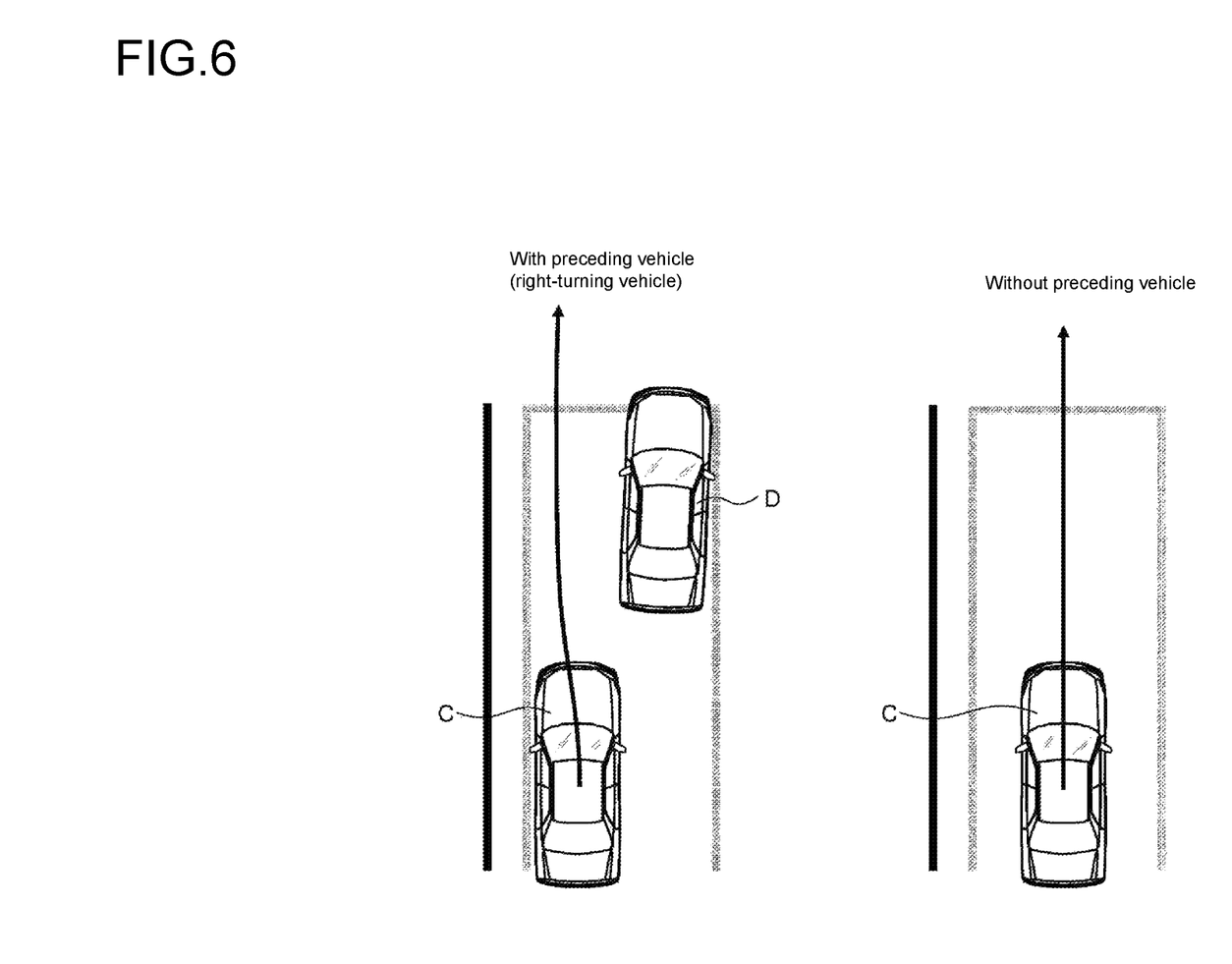
FIG. 6 is a set of conceptual diagrams illustrating a travel trajectory of a subject vehicle when there is a preceding vehicle (right-turning vehicle) and a travel trajectory of the subject vehicle when there is no preceding vehicle.

One or more embodiments of the present invention include specifying, using the travel histories, a travel path of another vehicle traveling in the same lane as the lane connected to the intersection and determining whether or not the lane is in the multiple lane form, on the basis of the relationship between a traveling direction of the other vehicle and a traveling direction of the subject vehicle after entering the intersection and the presence or absence of a preceding vehicle. FIG. 6 is a set of conceptual diagrams illustrating a travel trajectory of the subject vehicle when there is a preceding vehicle (right-turning vehicle) and a travel trajectory of the subject vehicle when there is no preceding vehicle. In one or more embodiments of the present invention, the multiple lane form is determined by distinguishing between a case in which there is a preceding vehicle that has advanced in a different direction than that of the subject vehicle and a case in which there is no preceding vehicle, and the multiple lane form can therefore be appropriately determined when a subject vehicle C takes a different trajectory, as illustrated in FIG. 6, depending on whether or not there is a preceding vehicle D. In the case of the example of FIG. 6, for example, traveling patterns are classified into three types: traveling straight ahead with a preceding vehicle; traveling straight ahead without a preceding vehicle; and turning right without a preceding vehicle.

One or more embodiments of the present invention include specifying, using the travel histories, a travel path of a following vehicle traveling in the lane connected to the intersection and determining whether or not the lane is in the multiple lane form, on the basis of the presence or absence of the following vehicle. For example, in the example of FIG. 6, when there is a following vehicle, a right-turning vehicle may move to the right to ensure a space for the following vehicle to pass through, but when there is no following vehicle, the right-turning vehicle may be in the middle of the lane. In the case of such a difference, the determination accuracy can be enhanced by determining the multiple lane form using the presence or absence of a following vehicle.

One or more embodiments of the present invention include providing a user with the lane information representing that the lane is in the multiple lane form. This can achieve appropriate driving assistance for a driver who is not familiar with the local rules. Moreover, in the case of autonomous driving, the driver is presented with the reason for acting in the autonomous driving and can thereby feel safe.

The multiple lane form determination unit 61 may execute a reset process for the multiple lane form information. Specifically, the multiple lane form is determined, the travel information for the most recent certain number of times (e.g., the most recent 100 times or the like) is acquired from the database 50 for each lane recorded in the database 50, and the multiple lane form is determined again in the above process. When a lane is not in the multiple lane form as a result of the determination, the multiple lane form information is deleted from the database 50. Additionally or alternatively, when the method of determining the multiple lane form is different, new information may be additionally recorded after deleting the multiple lane form information once. Through this operation, when the driving tendency has changed due to a change in the road structure or the like, the multiple lane form information can be deleted/edited. That is, one or more embodiments of the present invention include specifying the lane recorded as being in the multiple lane form among lanes represented by the road map information and determining whether or not the lane recorded as information on multiple lines is in the multiple lane form, on the basis of the travel histories within a most recent certain period.

Figure 7:
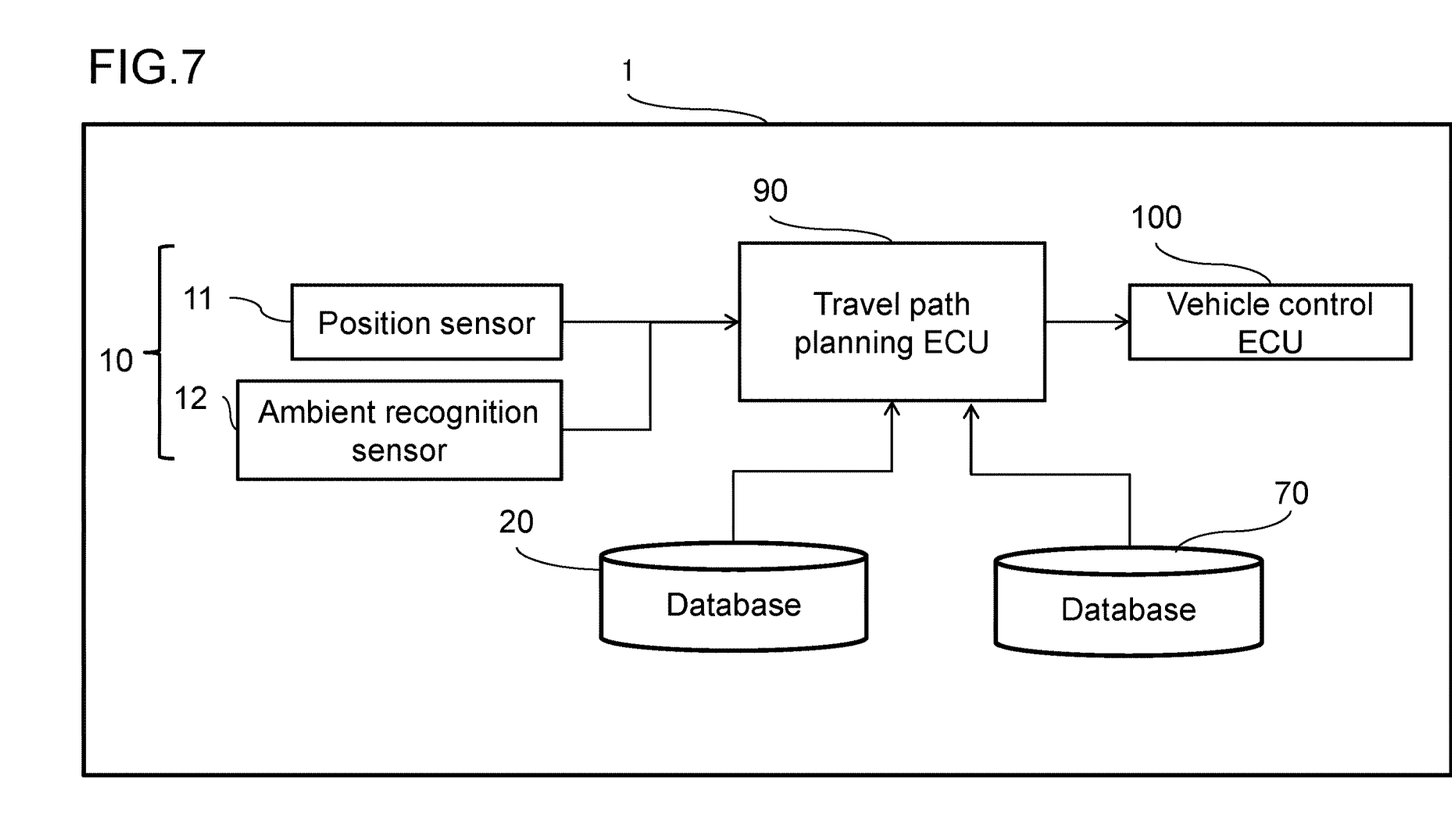
FIG. 7 is a block diagram of a vehicle in a modified example according to one or more embodiments of the present invention.

In a modified example according to one or more embodiments of the present invention, the lane information management method may include providing the vehicle 1 with a database on the server 2 side. FIG. 7 is a block diagram of a vehicle according to the modified example. The set of sensors 10 and the database 20 are the same as those in FIG. 1. A database 70 is provided to record at least the reference travel information and the multiple lane form information among the information stored in the database on the server 2 side and is associated with the map information recorded in the database 20 by the lane ID.

A travel path planning ECU 90 is provided, which is a controller that comprehensively controls the autonomous driving of the vehicle 1. For example, the travel path planning ECU 90 is configured to include a program that operates using a microcomputer and a memory. On the basis of the sensor information from the set of sensors 10 and the information stored in the database 20 and the database 70, a steering angle and a vehicle speed target value for performing the autonomous driving are calculated and sent to a vehicle control ECU 100. This calculation is based on a process flow, which will be described later.

The vehicle control ECU 100 is configured to include a program that operates using a microcomputer and a memory as in the travel path planning ECU 90. The vehicle control ECU 100 receives the target vehicle speed and steering angle of the vehicle from the travel path planning ECU 90 and performs drive control of the vehicle in cooperation with an engine control ECU (not illustrated), a steering motor control ECU (not illustrated), etc.

Figure 8:
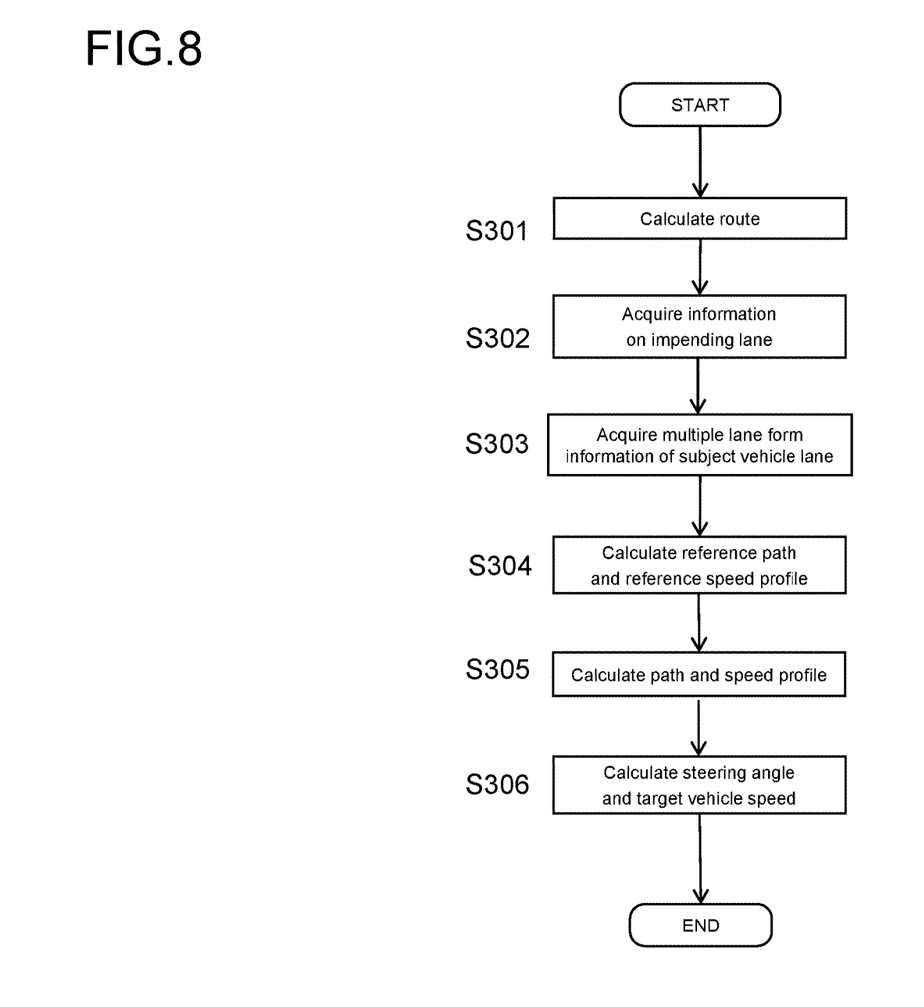
FIG. 8 is a flowchart illustrating a control flow in a travel path planning ECU of FIG. 7.

The process flow in the travel path planning ECU 90 will then be described with reference to FIG. 8.

In step S301, the travel path planning ECU 90 acquires information on a destination from a driver or the like, acquires positional information of the vehicle from the position sensor 11, and calculates a route to the destination using the map database 20. The control process of step S301 uses a so-called navigation function, but the map database 20 includes a highly accurate map for autonomous driving, so the route calculation is carried out at a lane level as to which lane to take.

In step S302, using the current positional information and the most recent route information, the travel path planning ECU 90 acquires from the database 20 the information on an impending lane in which the subject vehicle will travel from now.

In step S303, the travel path planning ECU 90 acquires from the database 70 the multiple lane form information of the impending lane in which the subject vehicle will travel from now.

In step S304, the travel path planning ECU 90 acquires the path information and the speed profile, which are included in the reference travel information, from the database 70. The database 70 assumed in the modified example includes information on the left and right boundaries and the center line of a lane and the vehicle speed limit in the lane as the lane information.

When the multiple lane form information is not recorded, the center line and the vehicle speed limit may be used as the reference path and the speed profile, respectively. When the multiple lane form information is recorded, the method of using the multiple lane form information is different depending on the method of separating lanes. When the multiple lane form is determined in accordance with the traveling direction, the reference information of an additional lane that is in the traveling direction of the subject vehicle may be used. When the multiple lane form is determined in accordance with the presence or absence of a preceding vehicle or a following vehicle, the presence or absence of a preceding vehicle or a following vehicle is determined on the basis of the information from the ambient recognition sensor 12, and then the reference information of an additional lane that matches the situation of the subject vehicle may be used.

In step S305, on the basis of the reference path and reference speed profile acquired in the control process of step S304, the travel path planning ECU 90 calculates the final travel path and speed profile (a sequence of target speed values at positions on the travel path) which the subject vehicle should take, in view of the surrounding environment situation calculated from the ambient recognition sensor 12, etc. The calculation of the travel path is based on a technique called path planning, and a commonly known realization scheme may be used.

In step S306, on the basis of the travel path and speed profile calculated in the control process of step S305, the travel path planning ECU 90 calculates the target vehicle speed and the steering angle and sends them to the vehicle control ECU 100. This is so-called path following, and a commonly used realization scheme may be used.

In the vehicle travel control method according to the modified example, the autonomous driving is controlled on the basis of the reference travel information, and it is therefore possible to realize appropriate driving behavior suitable for the local rules.

An example in which the database 70 is used for driving assistance will be described as another modified example according to one or more embodiments of the present invention. Although the configuration is basically the same as that in FIG. 7, the vehicle control ECU 100 has a function of presenting information to the driver.

The device which provides information to the user is, for example, a display installed in the center of the instrument panel of a vehicle. The vehicle control ECU 100 receives the reference travel path information adapted to the situation of the subject vehicle from the travel path planning ECU 90 and operates to display the reference travel path, for example, such as by superimposing it on the front camera image. The device which provides information to the user may also be a speaker, and when entering a lane in the multiple lane form, the driver may be informed by voice or sound that the lane is on a road on which a lane is often in the multiple lane form.

DESCRIPTION OF REFERENCE NUMERALS

1 Vehicle
2 Server
10 Set of sensors
20, 50 Database
40 Onboard communication module
60 Controller

The invention claimed is:

1. A lane information management method for managing lane information using a processor, comprising:
   acquiring road map information and information on travel histories that are represented by travel trajectories on a road map;
   determining, using a plurality of the travel histories, whether or not two or more vehicles in a lane connected to an intersection form different lines in a lateral direction of the vehicles on a single lane by the travel trajectories being positioned in two or more clusters that are a predetermined distance or more apart from each other;
   recording the lane information in a database, including a result of determination of the different lines indicating a multiple lane form in the lane information; and
   controlling a travel of a subject vehicle on a basis of the lane information recorded in the database.

2. The lane information management method according to claim 1, comprising:
   calculating lateral positions of the vehicles in an approach area through which the vehicles enter the intersection;
   specifying a set of the lateral positions as a position set; and
   when two or more position sets including the position set are specified in the approach area and a distance or distances between the two or more position sets are not less than a predetermined value, determining that the two or more vehicles in the lane including the approach area form the different lines in the lateral direction of the vehicles on the single lane.

3. The lane information management method according to claim 2, comprising:
   specifying the position sets in association with traveling straight ahead after entering the intersection and turning right or left after entering the intersection; and
   when the position sets can be classified in the approach area into a set that represents the traveling straight ahead and a set that represents the turning right or left, determining that the two or more vehicles in the lane including the approach area form the different lines in the lateral direction of the vehicles on the single lane.

4. The lane information management method according to claim 1, comprising:
   specifying the lane determined to be in the multiple lane form among lanes represented by the road map information; and
   rewriting link information of the specified lane with information representing that the two or more vehicles form the different lines in the lateral direction of the vehicles on the single lane.

5. The lane information management method according to claim 1, comprising:
   calculating reference travel information on a basis of the plurality of the travel histories, the reference travel information including information on a travel path in the lane; and
   calculating the reference travel information for each of two or more virtual lanes included in the lane determined to be a lane in which the two or more vehicles form the different lines in the lateral direction of the vehicles on the single lane.

6. The lane information management method according to claim 1, comprising:
   specifying, using the travel histories, a travel path of a preceding vehicle traveling in the lane connected to the intersection; and
   determining whether or not the two or more vehicles in the lane form the different lines in the lateral direction of the vehicles on the single lane, on a basis of a relationship between a traveling direction of the preceding vehicle and a traveling direction of a subject vehicle after entering the intersection and presence or absence of the preceding vehicle.

7. The lane information management method according to claim 1, comprising:
   specifying, using the travel histories, a travel path of a following vehicle traveling in the lane connected to the intersection; and
   determining whether or not the two or more vehicles in the lane form the different lines in the lateral direction of the vehicles on the single lane, on a basis of presence or absence of the following vehicle.

8. The lane information management method according to claim 1, comprising:
   specifying the lane recorded as a lane in which the two or more vehicles form the different lines in the lateral direction of the vehicles on the single lane, among lanes represented by the road map information; and
   determining, in the specified lane, whether or not the two or more vehicles form the different lines in the lateral direction of the vehicles on the single lane, on a basis of the travel histories within a most recent certain period.

9. The lane information management method according to claim 1, comprising providing a user with the lane information representing that the two or more vehicles in the lane form the different lines in the lateral direction of the vehicles on the single lane.

10. The method of claim 1, wherein the lane information used to control the travel of the subject vehicle is recorded as past histories in the database.

11. A lane information management device comprising a database and a processor, the database recording road map information and information on travel histories that are represented by travel trajectories on a road map, the processor operating to:
   acquire the road map information and the information on the travel histories from the database;
   determine, using a plurality of the travel histories, whether two or more vehicles in a lane connected to an intersection form different lines in a lateral direction of the vehicles on a single lane by the travel trajectories being positioned in two or more clusters that are a predetermined distance or more apart from each other;
   record lane information in the database, including a result of determination of the different lines indicating a multiple lane form in the lane information; and
   control a travel of a subject vehicle on a basis of the lane information recorded in the database.

12. The method of claim 11, wherein the lane information used to control the travel of the subject vehicle is recorded as past histories in the database.

13. A lane information acquisition method for acquiring, using an onboard controller in a subject vehicle, lane information of a lane in which the subject vehicle travels from a server for managing the lane information, comprising:
   acquiring, by the onboard controller, the lane information including multiple lane form information from the server to use the lane information for travel of the subject vehicle; and
   controlling a travel of the subject vehicle on a basis of the lane information, wherein
   the lane information is recorded in a database in the server and includes the multiple lane form information on a multiple lane form determined by a server controller in the server, and
   the multiple lane form information is information on a result of determination whether or not two or more vehicles form different lines indicating a multiple lane form in a lateral direction of the vehicles on a single lane connected to an intersection, the determination performed by the server controller using two or more travel histories that are represented by travel trajectories on a road map,
   wherein when the travel trajectories are positioned in two or more clusters that are a predetermined distance or more apart from each other, the two or more vehicles form different lines indicating the multiple lane form in the lateral direction of the vehicles on the single lane connected to the intersection.

14. The method of claim 13, wherein the lane information used to control the travel of the subject vehicle is recorded as a past histories in the database.

* * * * *